United States Patent [19]
de Putter

[11] 4,028,039
[45] June 7, 1977

[54] REMOVAL OF INJECTION MOULDED PRODUCTS

[75] Inventor: Warner Jan de Putter, Hardenberg, Netherlands

[73] Assignee: Wavin B.V., Netherlands

[22] Filed: Jan. 8, 1975

[21] Appl. No.: 539,723

[30] Foreign Application Priority Data
Jan. 9, 1974 Netherlands .................... 7400312

[52] U.S. Cl. .................. 425/436 R; 425/455 R; 214/1 B; 214/309
[51] Int. Cl.² .......................................... B29C 7/00
[58] Field of Search ....... 264/334; 425/436, 436 R, 425/437, 438, 443, 444, 455; 214/309, 310

[56] References Cited
UNITED STATES PATENTS

| | | | |
|---|---|---|---|
| 2,631,746 | 3/1953 | Holstebro et al. | 214/309 |
| 2,707,572 | 5/1955 | Rothman | 214/309 |
| 3,454,991 | 7/1969 | Rees | 425/151 |
| 3,702,749 | 11/1972 | Flusfeder et al. | 425/436 |

FOREIGN PATENTS OR APPLICATIONS

| | | | |
|---|---|---|---|
| 1,275,276 | 8/1968 | Germany | 425/DIG. 51 |
| 7,203,538 | 1/1972 | Japan | 425/436 R |
| 1,377,427 | 11/1969 | U.S.S.R. | 425/DIG. 232 |
| 1,263,152 | 4/1972 | U.S.S.R. | 423/436 R |

*Primary Examiner*—Robert L. Spicer, Jr.
*Attorney, Agent, or Firm*—Wilkinson, Mawhinney & Theibault

[57] ABSTRACT

Method for automatically removing a synthetic resin article from the die of an injection moulding machine, whereby this article during the time that the die halves are in the open position, is removed and conveyed into a particular direction by a grab, whereupon a lateral transfer and supporting member discharges the article.

3 Claims, 5 Drawing Figures

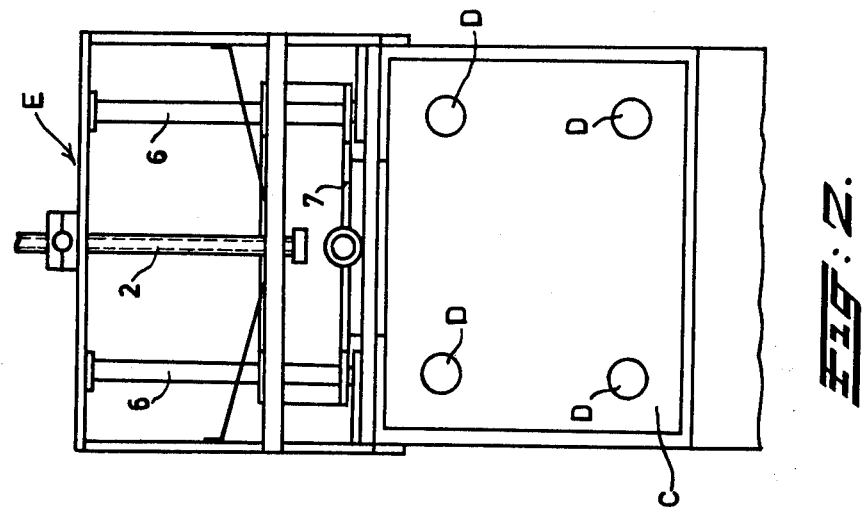
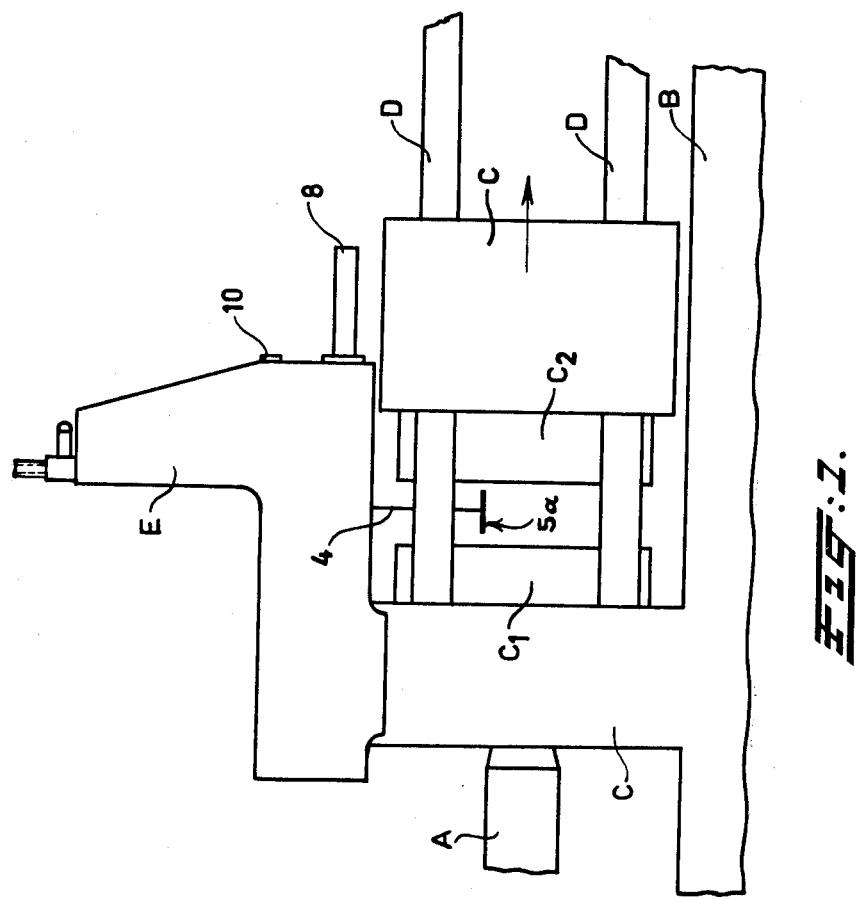

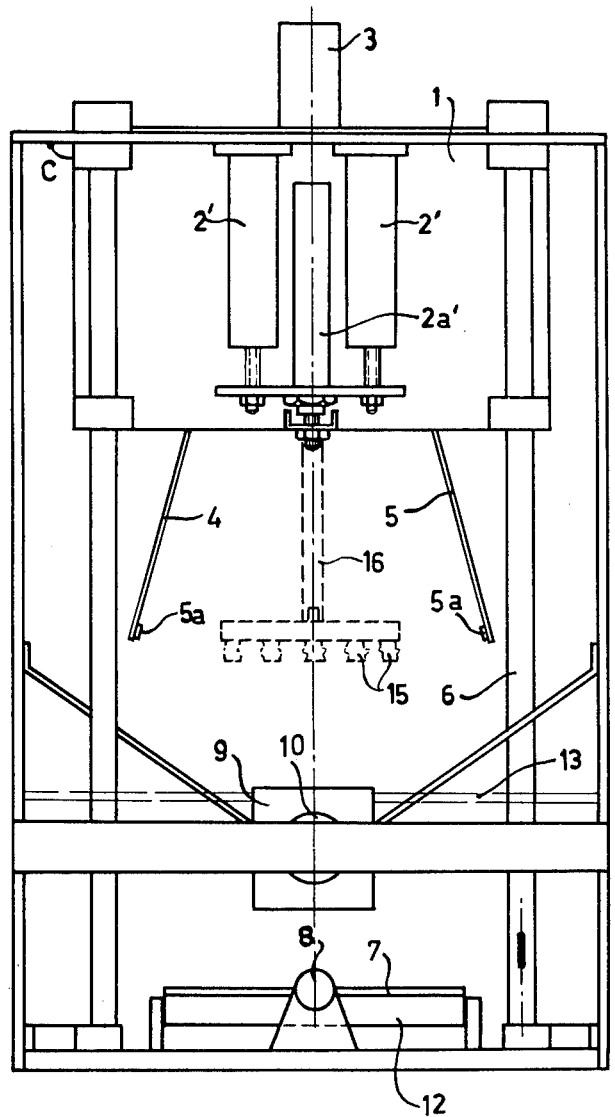
FIG: 5.

4,028,039

REMOVAL OF INJECTION MOULDED PRODUCTS

BACKGROUND OF THE INVENTION

My invention relates to a method for automatically removing synthetic resin articles from the die of an injection moulding machine.

Such a method is known per se. For example it is possible when the die halves are in the open position, to seize the synthetic product by means of a grab and remove it from the die. After this operation the grab should discharge the product by a rotary or swinging movement to outside the active area of the injection moulding machine. Such a method has the drawback that a complicated and consequently expensive, apparatus is required for performing all these movements of the grab. When performing such a method much space is occupied, and this will be very disadvantageous because in most cases the product should undergo a subsequent treatment, like e.g. printing, labelling, stacking to a particular unit etc.

Such subsequent treatments are as a rule performed with equipment which likewise occupies space, while in addition thereto there should also be space for operators etc. in charge of supervision and inspection.

SUMMARY OF THE INVENTION

It is aimed at to alleviate these difficulties and to provide a method for automatically removing a synthetic resin article from the die of an injection moulding machine. Characteristic for this method is that the synthetic resin article during the time that the die halves are in the open position, is removed and conveyed to a particular direction by a grab which was previously introduced thereinto, whereupon a lateral transfer and supporting member discharges the article to outside the operative area of the injection moulding machine.

In this manner the complicated movements of a grab are reduced to simple ones to be performed each time by one grab while also a considerable saving in space is obtained.

The method according to the invention is advantageously performed by the arrangement that after the die halves have already been partially opened the grab is introduced into the space created in this manner and this grab is caused to cooperate with the synthetic resin article. Hereby the resting time, that is to say the time between the entirely open position of the die halves and the time before closing, is limited to a minimum and the suitable synthetic resin products can be removed in a simple manner from the core of the die.

The grab can cooperate with the synthetic resin article by suction, by gripping, or by embracing protruding parts of the article, by insertion into hollow parts or holes of the wall of the product or in any other way.

A preferred embodiment of the method according to the invention consists in that the direction of movement of the synthetic resin article by the grab intersects the direction of discharge of the lateral transfer and supporting member. Therefore a saving in space can be effected in a simple way.

According to another preferred embodiment of the above described method, the synthetic resin product is moved by the grab to a position above the die halves of the injection moulding machine and discharged.

The advantage thereof is that no additional floor surface is required because the operations can be performed in the "lost" space above the die. Besides the acting devices are easily accessible to the operators for supervision and inspection.

The method according to the invention is advantageously performed by the arrangement that during the removal of the synthetic resin article from the die, the grab initiates the discharge movement of the lateral transfer and support member. Thus a very great operation safety is obtained.

Another embodiment of the method according to the invention consists in that the working speed of the grab during the time that the die halves are in the open position, is higher than during the time that the die halves are in the closed position. The resting time, if any, caused by the operation of the device is limited to a minimum, while also a constant resting time is ensured.

The invention also relates to a device for performing the method described above, which device consists of an injection moulding machine with a grab near the die part of th machine for removing and discharging the synthetic resin product and means for moving the grab, a grab has a range covering the entire space formed by the open die halves to beyond a lateral transfer or supporting member which has a range to outside the operative area of the injection moulding machine. The device according to the invention is inexpensive on account of the simple construction and is flexible, due to the selective position of the grabs.

The device according to the invention distinguishes itself by the fact that the range of the first grab intersects the range of the lateral transfer and supporting member, so that a compact construction of the device is obtained.

In principle each synthetic resin article can be removed from the injection moulding machine, but the method and device according to the invention lend themselves in particular for removing big-sized articles.

SURVEY OF THE DRAWINGS

FIG. 1 is a partial front view of a part of an injection moulding machine, while the device according to the invention is shown above the die part;

FIG. 2 is a side elevation to FIG. 1;

FIG. 3 represents the device according to the invention, and in dotted lines a modified embodiment;

Figures 4, 5:
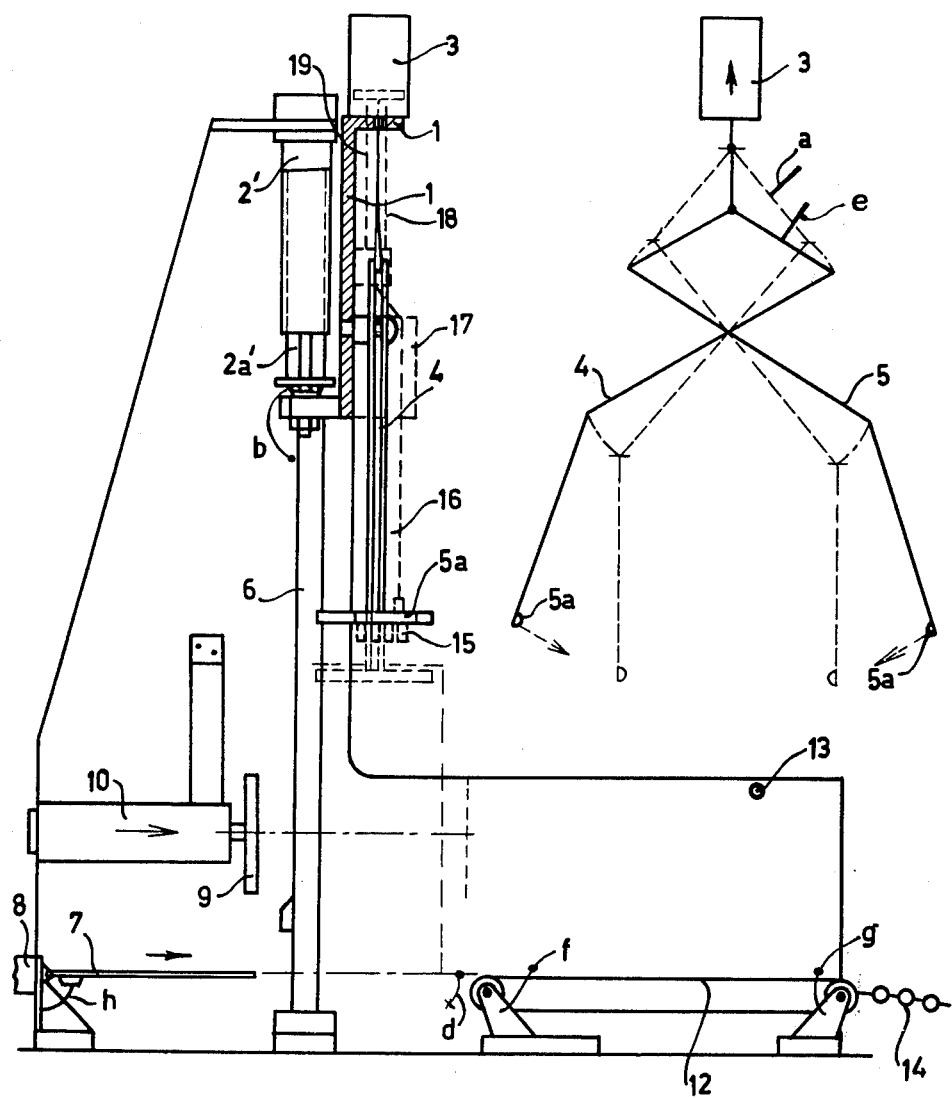
FIG. 4 is a side elevation of the device according to FIG. 3 and in dotted lines the modified embodiment as shown in FIG. 3 and FIG. 5 schematically shows parts of the grab.

DESCRIPTION OF PREFERRED EMBODIMENTS:

In FIG. 1 the known parts of an injection moulding machine are visible: the cylinder with the injection nose A, the underframe B, the holding plates C with the die halves C1, C2 and the guide beams D.

On the die part C a device E is arranged, executed according to the invention. Visible is a part of the grab 4–5 (FIG. 1) and a part 7 of the lateral transfer and supporting member (FIG. 2).

The lower part of the grab of the devices (FIG. 3 and 4) comprises two grab arms 4, 5 which are movably mounted on a guide plate 1, which on its turn can move along the guide beams 6.

The grab arms 4–5 may be provided at their end with thickened portions and/or protrusions 5a, which are adapted to the wall parts to be seized of the synthetic resin article. Although the grab arm can be made of metal the part of the grab arms 4, 5 which is active in the space between the open die halves consists preferably of synthetic material, so that in case of improper use of the device the die halves cannot be damaged when they are closing and the grab arms have not been removed in time. The type of synthetic material is adapted to the working conditions, like e.g. the temperature of the die halves. So polyolefines, like polypropylene and polyamides, like nylon 6 can be used at temperatures up to some 100° C. Above this valve heat resistant synthetic materials and rubbers with adapted hardness are suitable, like for instance polyimides and silicon rubbers.

The grab arms 4,5 are combined, so as to form a tongs (FIG. 4 and 5) and are provided with movement limiting means which can switch on the contacts e and a. Contact e excites the pneumatic cylinder 10, which can set part 9 lateral transfer and support plate into motion, as will be explained extensively, when describing the method; when contact a is switched on, the die halves C1, C2 (FIG. 1) are moved to their extreme open position.

Guide plate 1 can switch on a contact b, whereby via the pneumatic cylinders 2' and/or 2'a the movement of the guide plate to the injection moulding machine can be interrupted. Guide plate 1 can also switch on a contact c (FIG. 3), whereby part 7 (FIG. 4) of the lateral transfer and supporting member is set into motion and the movement of the guide plate 1 is stopped.

The movement of the guide plate 1 from and to the injection moulding machine is effected by the pneumatic 2' and the pneumatic cylinder 2'a. The pneumatic cylinders 2' and 2'a may simultaneously or individually move the guide plate. It is also possible that at a given moment during the movement through cylinder 2' the guide plate is accelerated through cylinder 2'a. It is obvious that there should be means which then switch on the contacts in question (not shown).

The lateral transfer and supporting member of the device comprises the flat plate 7 (FIG. 4) presser plate 9 and in the shown embodiment the belt conveyor 12 and the roller track 14 which transfer the article to a device outside the operative area of the injection moulding machine. A movable flat plate as a supporting member is advantageous as hereby the operative area of the injection moulding machine can be guarded during the movement of the article over the machine, so that it and/or parts of the injection moulding machine are not damaged when trouble occurs. The presser plate 9 can move the synthetic resin article on the movable flat plate 7 to the desired position. Although switching via a contact is possible, the pneumatic cylinder 10 is constructed such that the presser plate 9 after it has been brought to its extreme position, returns to its initial position.

Besides the contacts c already mentioned (for the movable flat plate 7) and e' (for the movement of the presser plate 9), the movable flat plate 7 contains a means for switching on contact d which, via the pneumatic cylinder 3 moves the grab arms 4–5 whereby the tongs places the synthetic resin article on plate 7. This release movement of the tongs activates via contact e (FIG. 5), as has already been mentioned, presser plate 9.

The synthetic resin article switches on contacts f and g during the discharge movement (FIG. 4). Contact f switches on again the injection moulding machine for the next cycle and via contact g, the pneumatic cylinder 8 is energized reversely so that the flat movable plate 7 moves in reverse direction to the initial position and switches on contact h. This switching can, via the pneumatic cylinder 2' and/or 2'a, set the guide plate 1' again into motion.

In some cases contacts f and g may coincide independently of the injection moulding cycle and the article to be manufactured, that is to say, that a contact initiates the aforementioned operations.

The movements of the grab and lateral transfer members of the device are preferably effected by pneumatic members like the afore mentioned pneumatic cylinders, in order to attain the desired high speeds. If less critical requirements are imposed, the movement can be affected by mechanical members, like e.g. a threaded spindle. In some cases a combination of pneumatic and mechanical members may also be suitable.

The method for automatically lifting synthetic resin articles from the injection moulding machine by means of the aforementioned device is performed as follows:

Through contact h switched on by the movable flat plate (7) (FIG. 4) of the preceding lifting cycle, the pneumatic cylinders 2' are activated, whereby guide plate 1 moves downwardly along guide beams 6. In dependence of the injection moulding cycle the die halves C1 and C2 open partially in the course of or at the end of this movement and in this position the injection moulding machine switches on a contact not shown in the drawing, whereby via pneumatic cylinder 2'a guide plate 1 moves further downwardly until the contact b is switched on. Guide plate 1 stops and grab arms 4–5 are in the desired position over the partially opened halves of die, while by switching on contact b and subsequent acuation of the pneumatic cylinder 3 the grab arms 4,5 move towards each other and seize thereby the synthetic resin article, e.g. a bottle crate of polypropylene, in the space between the two die halves. These tongs also switch on contact a (FIG. 5), whereby the die halves C1 and C2 open to their extreme position and entirely release the article so that the same is left in the grab arms 4,5. In this extreme position of the dies the injection moulding machine again switches on a contact (not shown), whereby the pneumatic cylinders 2' and 2'a are jointly energized, so that the first grab is moved upwardly along the guide beams 6 and the synthetic resin article is vertically removed from the space between the die halves.

Since the means on guide plate 1 switch on contact c during the upward movement the grab stops in the original starting position, while simultaneously pneumatic cylinder 8 is energized, whereby the movable flat plate 7 protrudes underneath the synthetic resin article and thereby screens the operative part of the two die halves.

In the extreme position of plate 7 contact d is switched on, whereby the gripping arms 4,5 which are at first moved towards each other, through the pneumatic cylinder 3, now move apart again via 3 and the product comes to bear on the movable flat plate 7. When the movement of the tongs has come to a standstill then, via contact e (FIG. 5), presser plate 9 is moved via the pneumatic cylinder 10, presser plate 9 pushing the synthetic resin article over plate 7 on a belt conveyor 12 and returning thereupon to its starting position. The synthetic resin product meets contact f on its discharge track, so that the injection moulding machine becomes available for the next injection moulding cycle, and thereupon contact g, which activates the pneumatic cylinder 8 in the reverse direction, whereby the flat plate 7 returns to the starting position, and by switching on contact h, the next lifting cycle begins.

On its discharge track on the conveyor 12 the synthetic resin article meets rod 13, so that due to tilting, the article is further discharged on roller track 14, while standing on its bottom.

FIGS. 2 and 3 also show a modified embodiment in dotted lines, which is particularly suitable for removing double walled crates from the die halves in a very rapid way.

This can be done by replacing the grab arms 4,5 with a plate with suction cups 15. The suction cups are connected with a conduit 16 to be connected to a vacuum pump during the engaging action between article and cups and to a high pressure fluid source for disengaging the cups and the article.

For performing a rapid removal of the article from the cups 15, the device is provided with a valve 17 being connected with a vacuum line 18 and a compressed air source line 19 for passing a push of compressed air to the cups 15.

In this embodiment switch a is superfluous as the movement of the injection moulding machine has not to be stopped. Contact d activates valve 17 for closing vacuum line 18 and for opening the line 19. This contact also initiates the movement of the flat movable plate 7. Contact e is also superfluous in this device. At the time of opening of the high pressure line 19 a push of compressed air is blown through conduit 16.

What I claim is:

1. A device for automatically removing a plastic article from the mould of an injection moulding machine having a pair of die halves, comprising a grab supported near the mould part of the machine for removing. and discharging a synthetic plastic article; means for moving said grab; said grab having a range covering the entire space formed by the open die halves; a lateral transfer and support member; means for moving said lateral transfer and support member; said transfer and support member having a range outside the operative area of the injection moulding machine for receiving said articles from the grab and discharging said articles beyond the machine; an actuating means comprising at least one moving part on the grab which sets the lateral transfer and support member into motion; the lateral transfer and support member comprising a laterally movable flat plate upon which the moulded articles are transferred externally of the machine; the range of said plate of the lateral transfer and support member intersecting the range of said grab to effect the article discharge; and means for increasing the moving speed of the grab when the die halves are partially open whereby the time between entirely open die halves and entirely closed die halves is minimized.

2. A device as claimed in claim 1 wherein said grab comprises at least two grab arms forming a tong.

3. A device as claimed in claim 1 wherein said grab arms consist of synthetic material.

* * * * *